US012633871B2

(12) United States Patent
Russell

(10) Patent No.: US 12,633,871 B2
(45) Date of Patent: May 19, 2026

(54) SOLAR ENERGY SYSTEM

(71) Applicant: Matthew F. Russell, Spokane, WA (US)

(72) Inventor: Matthew F. Russell, Spokane, WA (US)

( * ) Notice: Subject to any disclaimer, the term of this patent is extended or adjusted under 35 U.S.C. 154(b) by 0 days.

(21) Appl. No.: 17/803,360

(22) Filed: May 31, 2022

(65) Prior Publication Data

US 2023/0387853 A1     Nov. 30, 2023

(51) Int. Cl.
| | |
|---|---|
| *H02S 40/42* | (2014.01) |
| *F28D 3/04* | (2006.01) |
| *F28D 15/00* | (2006.01) |
| *H02S 20/21* | (2014.01) |

(52) U.S. Cl.
CPC ............. *H02S 40/425* (2014.12); *F28D 3/04* (2013.01); *F28D 15/00* (2013.01); *H02S 20/21* (2014.12)

(58) Field of Classification Search
CPC .......... H02S 40/425; H02S 20/21; F28D 3/04; F28D 15/00
See application file for complete search history.

(56) References Cited

U.S. PATENT DOCUMENTS

| | | | | |
|---|---|---|---|---|
| 4,491,681 | A * | 1/1985 | Kirpich | ............... H01L 31/0508 |
| | | | | 136/246 |
| 4,830,677 | A * | 5/1989 | Geisler, Jr. | .............. F24S 10/40 |
| | | | | 136/246 |
| 10,447,200 | B1 * | 10/2019 | Fakih | ....................... H02S 40/34 |
| 10,483,906 | B1 * | 11/2019 | Towe | ....................... F24S 23/12 |
| 2017/0272031 | A1 * | 9/2017 | Yuque | ................... H02S 40/425 |
| 2020/0007079 | A1 * | 1/2020 | Anderson | ............. H02S 40/425 |
| 2021/0234503 | A1 * | 7/2021 | Khayyat | ................. F24S 40/55 |
| 2023/0148487 | A1 * | 5/2023 | Croce | .................... A01G 9/247 |
| | | | | 47/21.1 |

* cited by examiner

*Primary Examiner* — Kristina N Junge
(74) *Attorney, Agent, or Firm* — Reidlaw, L.L.C.; John S. Reid

(57)     ABSTRACT

A solar energy system includes solar panels supported by support trays which include cooling fluid passageways to allow a cooling fluid to convect heat from the solar panels to a static air heat exchanger. The system includes an atmospheric moisture extraction system to periodically cool air from the heat exchanger by alternately releasing the hot static air into one of two water piston units which are in fluid communication with one another, discharging previously discharged hot air from the second of the water piston units, and afterwards drawing in fresh cool air into the second water piston unit, and the heat exchanger, all by the selected sequential use of control valves under the guidance of a control unit. The fresh cool air is drawn into the water piston units through an orifice, condensing water vapor in the air into liquid water in the water piston units.

20 Claims, 11 Drawing Sheets

SOLAR ENERGY SYSTEM

BACKGROUND

As photovoltaic cells become more efficient and more affordable, the use of solar energy to generate electrical power is becoming more prevalent. Popular placement for these photovoltaic cells (which I will also refer to as solar cells) is in small residential installations (primarily on the rooftops of homes), on large commercial buildings (again, primarily on the rooftops thereof), and in large commercial installations (commonly found in desert and agricultural locations). An important consideration in the use of solar cells is maximizing the efficiency of the cells (i.e., the conversion of solar energy into electrical energy). Beyond the design of the cell themselves, efficiencies can be increased by providing arrays of the cells with solar tracking devices to reduce the angle of incidence between the sun's rays and the solar cells. Another recent innovation to increase efficiency is double sided or bifacial solar cells. However, the typical mounting of solar panels (i.e., arrays of solar cells) leads to certain inefficiencies. Specifically, with respect to roof-mounted solar panels, the fixed position of the roof, and the proximity of the panels to the roof, limits the amount of travel of the solar panel in being able to place the panel at an optimum position with respect to the sun. Further, in both roof-mounted and terrain mounted solar panels, proximity to the supporting surface allows the panels to heat up, thus reducing efficiency. This proximity of the bifacial solar panel to the supporting surface also limits the exposure of the lower side of the bifacial panel, further reducing efficiency of the panel. It is thus desirable to provide a solar energy system which addresses these issues to improve electrical energy produced by the solar cells in the system.

A further problem with terrain-mounted solar arrays is that they are oftentimes placed over high albedo surfaces, such as sand in deserts. These high albedo surfaces help to cool the Earth from solar warming by reflecting notable amounts of solar energy back into space. It is thus undesirable to cover such surfaces. A further disadvantage to locating solar power arrays in desert locations is that such locations are typically remote from population and industrial centers where the electrical energy is needed—thus necessitating additional infrastructure, along with concomitant transmission losses.

DETAILED DESCRIPTION

Figure 1:
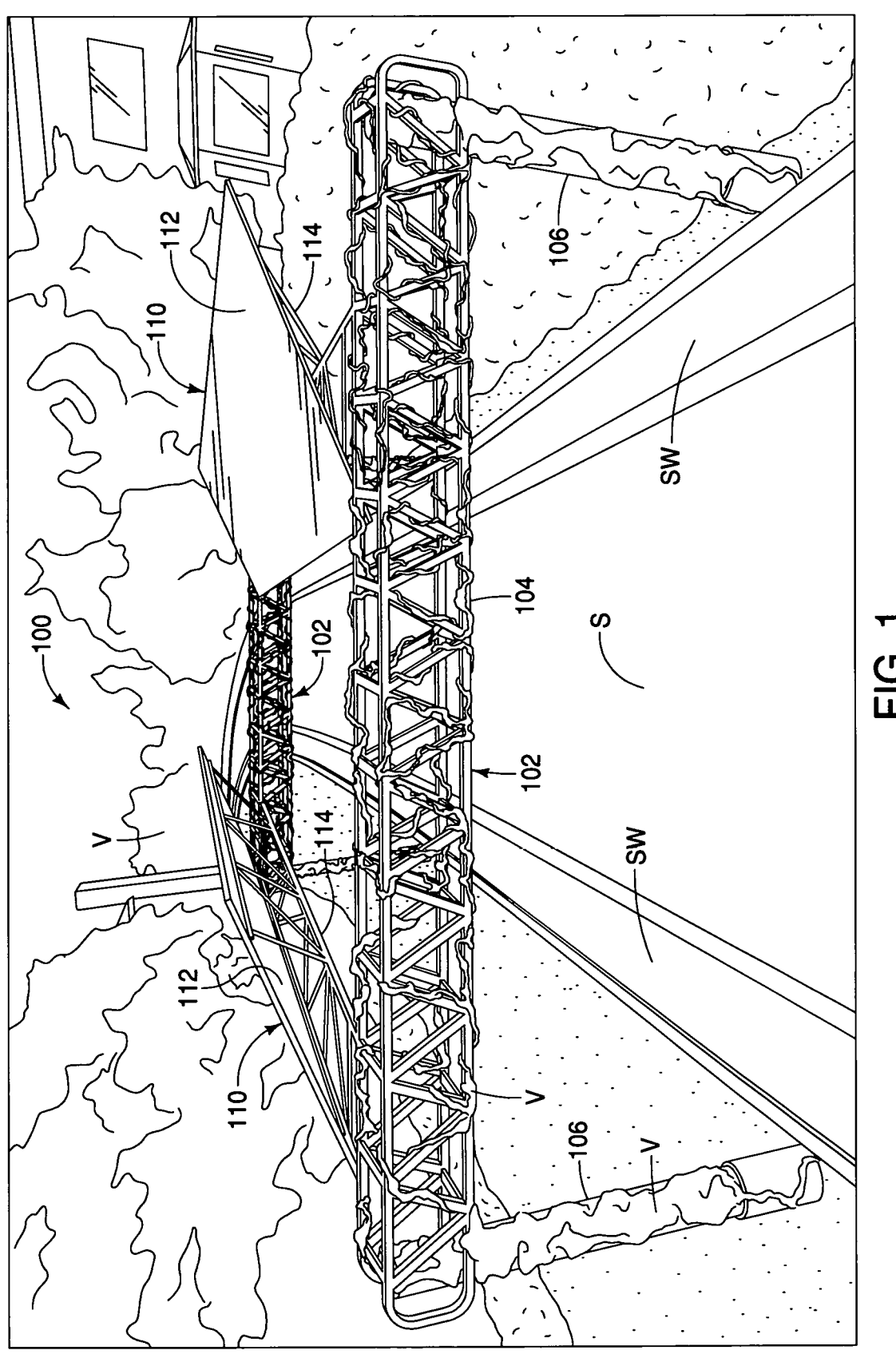
FIG. 1 is a perspective view of a solar energy system, according to the present disclosure, located in an urban setting.

With reference to the accompanying drawings, FIG. 1 is an environmental view depicting a solar energy system (100) in accordance with the present disclosure. The system 100 includes one or more solar panels (112), each solar panel having a plurality of photovoltaic cells (not individually depicted in the drawing). The solar panels (112) are supported by a solar panel support frame 114, which together form a solar panel assembly (110). Each solar panel assembly 110 is supported by a solar panel assembly support truss (104), which is in turn supported by stanchions 106, the trusses (104) and stanchions (106) together forming a solar panel support structure (102). The solar panel support structure 102 depicted in FIG. 1 thus includes four stanchions (106) arranged in a generally rectangular pattern (in plan view), with the ends of the rectangle being formed by the solar panel support trusses (104), and the sides of the rectangle being generally formed by the solar panel assemblies (110). As depicted in FIG. 1, the solar panel assemblies (110) are supported by the solar panel support structure 102 over an urban street "S", which is bordered by sidewalks "SW". The solar panels 112 thus provide shade for the street and sidewalks. Further, streets and sidewalks are generally low albedo surfaces, and thus by shading them with the solar panel assemblies 110, these surfaces will tend to be heated less from solar radiation. Additionally, being generally low albedo surfaces the streets and sidewalks will reradiate any solar energy they absorb, and since the solar panels 112 are preferably bifacial solar panels, the lower surfaces of the panels can make use of the reradiated solar energy from the streets and sidewalks. The solar energy system can incorporate local vegetation ("V") such as creeping vines, trees and shrubbery to give the system a less industrial look in urban areas.

Figure 2:
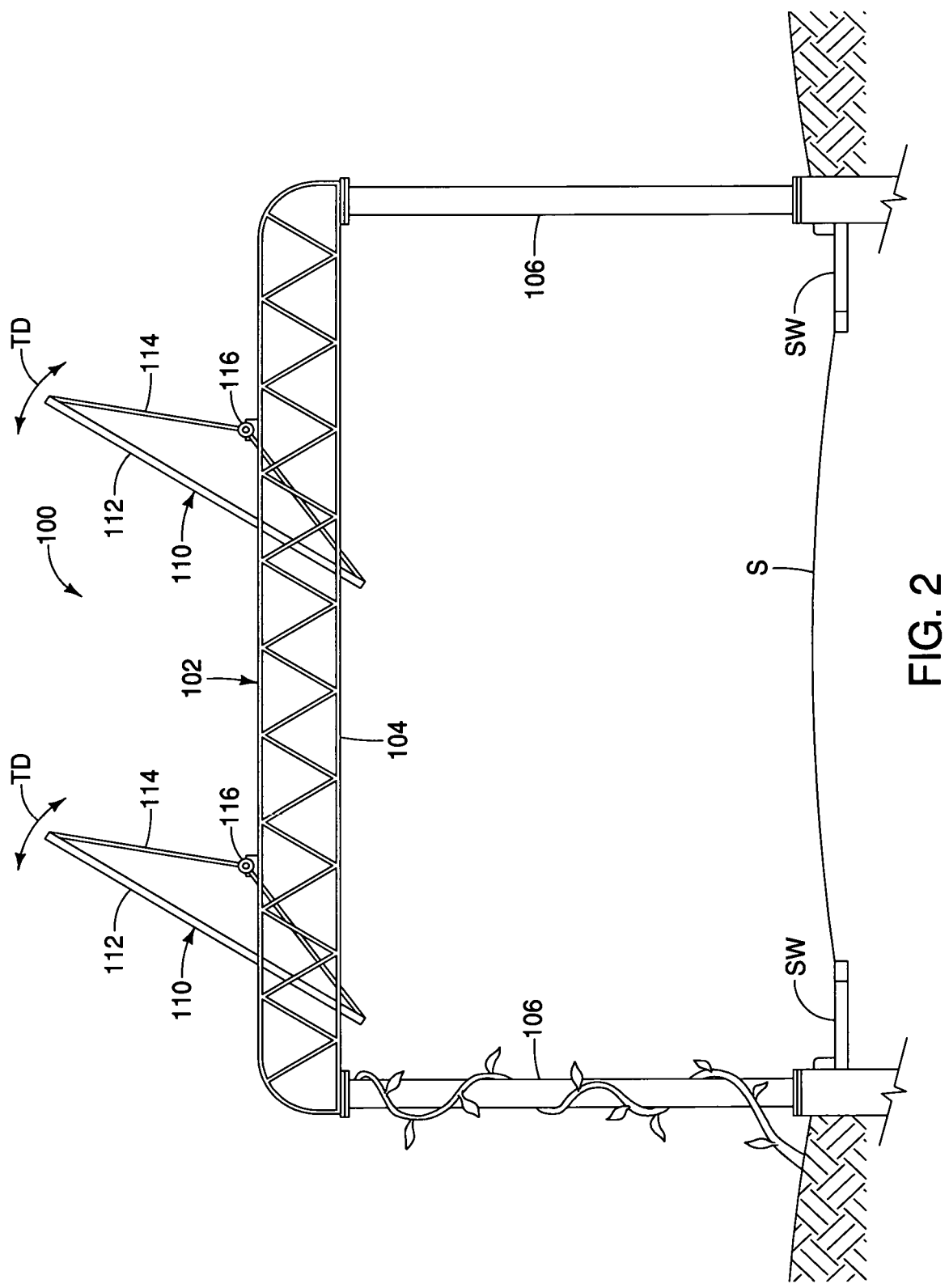
FIG. 2 is a front view of the solar energy system of FIG. 1.

Turning to FIG. 2, the solar energy system 100 of FIG. 1 is depicted in an end view. As indicated in FIG. 2, the solar panel assemblies 110 are pivotably mounted to the solar panel support truss 104 by primary pivot mounts 116. The primary pivot mounts 116 allow the solar panel assemblies 110 to be rotationally moved in directions "TD" (for "Time-of-Day") in order to optimize the angle of incidence between rays of incoming sunlight and the faces of the solar panels 112 (and thus maximize power generation by the photovoltaic cells in the solar panels). Typical range of rotation for time-of-day positioning is 120 degrees (i.e., 60 degrees on either side of horizontal), and can be higher (e.g., 180 degrees). Time-of-day positioning of solar panels, also known as solar tracking, and the equipment used to perform the positioning, is well known in the art, and need not be described nor shown further herein.

Figure 3:
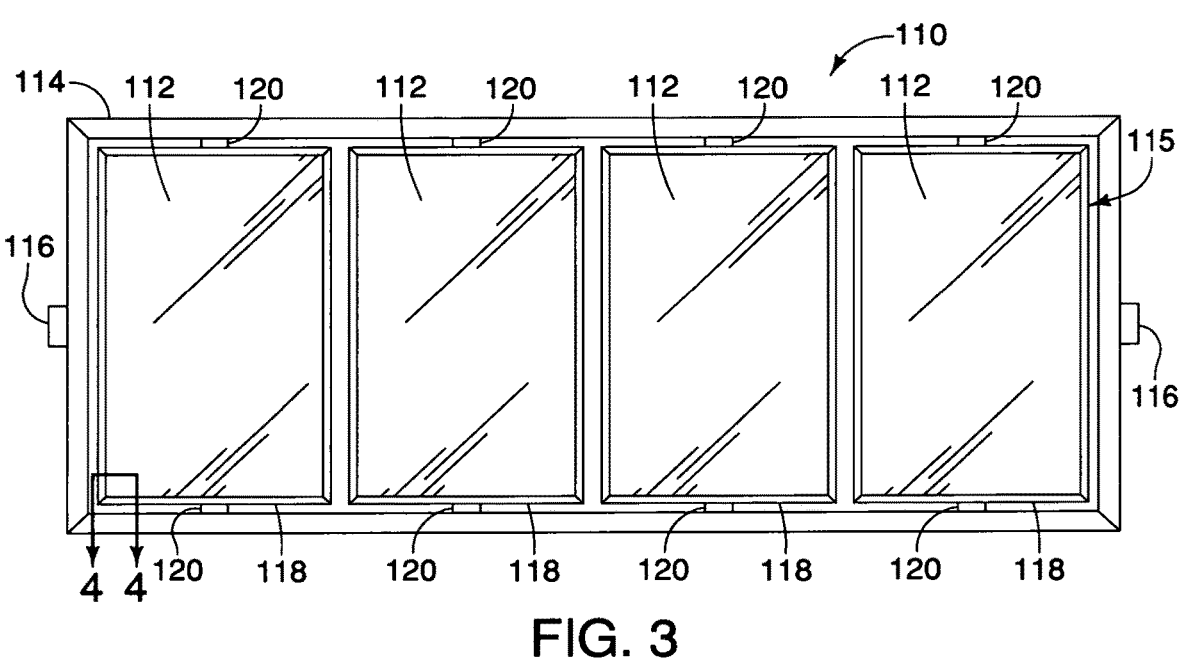
FIG. 3 is a plan view of a solar panel assembly that can be used in the solar energy system of FIGS. 1 and 2.

FIG. 3 is a plan view of one of the solar panel assemblies 110. As depicted in FIG. 3 the solar panel assembly 110 includes several solar panels 112 which are supported by the solar panel support frame 114. (Here, only four such solar panels 110 are depicted as being supported by the support frame 114, but the actual number of solar panels supported by the frame 114 can be more or less than as depicted.) Each solar panel 112 is supported by a solar panel support tray 118, which generally forms a frame around the perimeter of the solar panel. The solar panel support trays 118 are pivotably mounted to the solar panel support frame 114 by secondary pivot mounts 120. The secondary pivot mounts 120 allow the solar panels 112 to be rotationally moved in a direction orthogonal to the primary pivot mounts 116 in order to allow equinox (or seasonal) tracking of the sun, and thus further optimize the angle of incidence between rays of incoming sunlight and the faces of the solar panels 112. Seasonal tracking of solar panels, in conjunction with time-of-day tracking, is known in the art as dual-axis tracking, and the equipment used to perform such tracking is well known and need not be described nor shown further herein. It will also be appreciated that the direction of mounting of the solar panel assemblies 110 within the solar panel support structure 102 (i.e., with the assemblies orthogonal to the trusses 104, as depicted in FIG. 2, or with the assemblies parallel to the trusses) will typically depend on placing the time-of-day pivot mounts 116 in a position to take advantage of east-west travel of the sun, and the secondary pivot mounts 120 in a position to take advantage of seasonal north-south variations of the position of the sun. The solar panel trays 118 are essentially open frames that support the solar panels 112 (as will be described more fully below). In this way bi-facial (i.e., two-sided) solar panels can be used in the support trays 118. Each solar panel 112, in conjunction with its respective solar panel support tray 118, forms a solar panel subassembly 115 (only one of which is numbered so in FIG. 3). Preferably the solar panel support frames 114 are configured to rotate at least 270 degrees relative to the support structure 102 for cleaning and servicing of the solar panels 112, and more preferably are configured to rotate in full, and continuous, 360 rotations.

Figure 4:
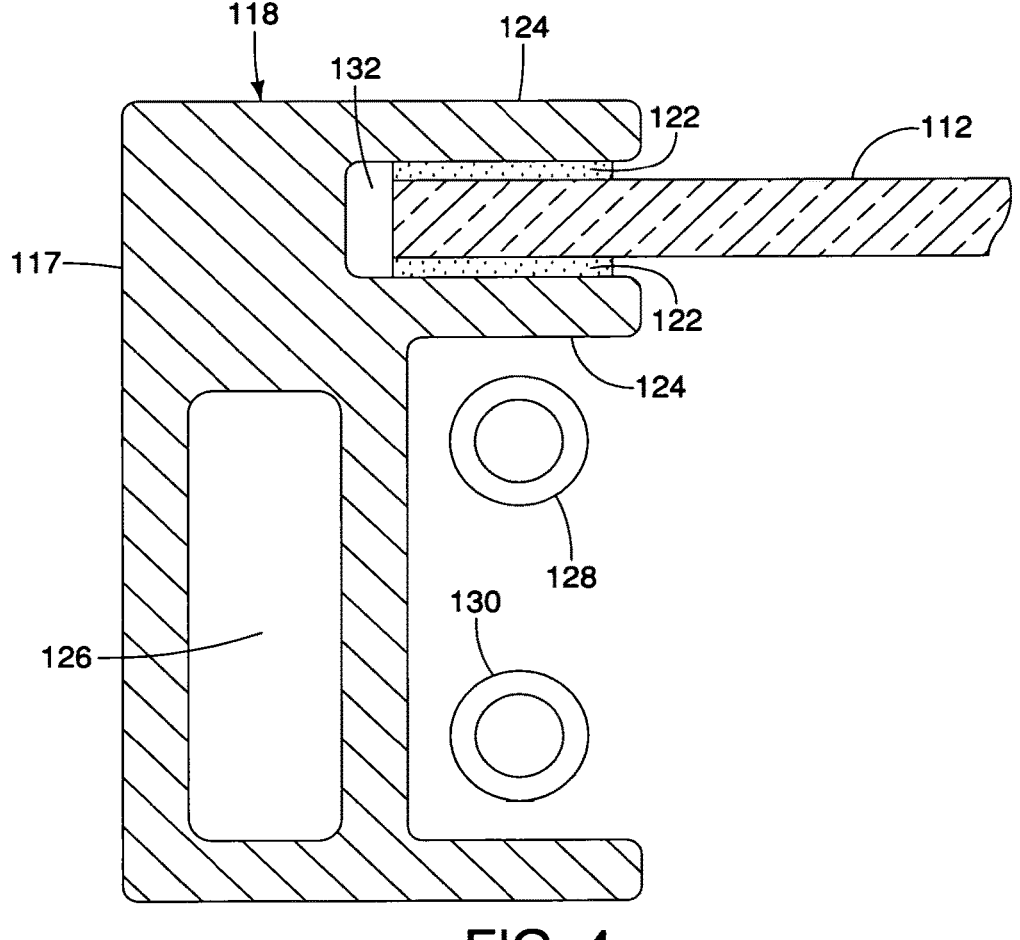
FIG. 4 is a cross sectional view of a solar panel tray member which includes a coolant channel within the member.

An objective of the apparatus disclosed and described herein is to lower the operating temperature of solar panels, thus improving their efficiency (i.e., conversion of solar energy into electricity). The present disclosure includes different embodiments for achieving this objective. In general, the embodiments can be divided into two groups: passive cooling (by heat dissipation means) and active cooling (by dynamic movement of a cooling medium). One example of an active solar panel cooling system is partially depicted in FIG. 4, which is a sectional view of one member of a solar panel support tray 118, and including a portion of a solar panel 112. The solar panel 112 in FIG. 4 is depicted in side (or edge) view, and is received within slot 132 of the support tray segment 117. The support tray 118 includes four such segments 117, arranged to form the rectangular trays as depicted in FIG. 3. The support tray segments 117 of FIG. 4 are extruded metal channel sections, and are preferably made of a metal having high thermal conductivity, such as aluminum. The tray segments 117 define a hollow cooling fluid passageway 126 through which a cooling fluid can be passed to convect heat away from the tray segment. The solar panel 112 is held in place in the slot 132 in the tray segment 117 by a thermal adhesive 122, which assists in conducting heat from the solar panel 112 into the solar panel tray segment 117. The solar panel tray 118 can also support cooling return and supply lines 128 and 130. The configuration depicted in FIGS. 3 and 4 (i.e., a plurality of solar panel subassemblies 115, supported by a solar panel support frame 114, as per FIG. 3, with each solar panel subassembly having a separate cooling tray 114, per FIG. 4) addresses a problem which arises with current solar energy systems. A recent trend in solar energy systems is to use larger and larger solar panels, in the belief that this provides improved economics by reducing the amount of support structure per square foot of solar panel. While this may be true, these large solar panels suffer from increased operating temperatures, which cannot be fully addressed by present cooling systems. Rather, a solar energy system, as provided for herein, which uses more and smaller solar panels (112, FIG. 3), versus fewer and larger solar panels, can operate more efficiently when the smaller solar panels are cooled, as further provided for herein. Additionally, smaller solar panels are typically more readily available versus larger solar panels.

Figures 5A, 5B:
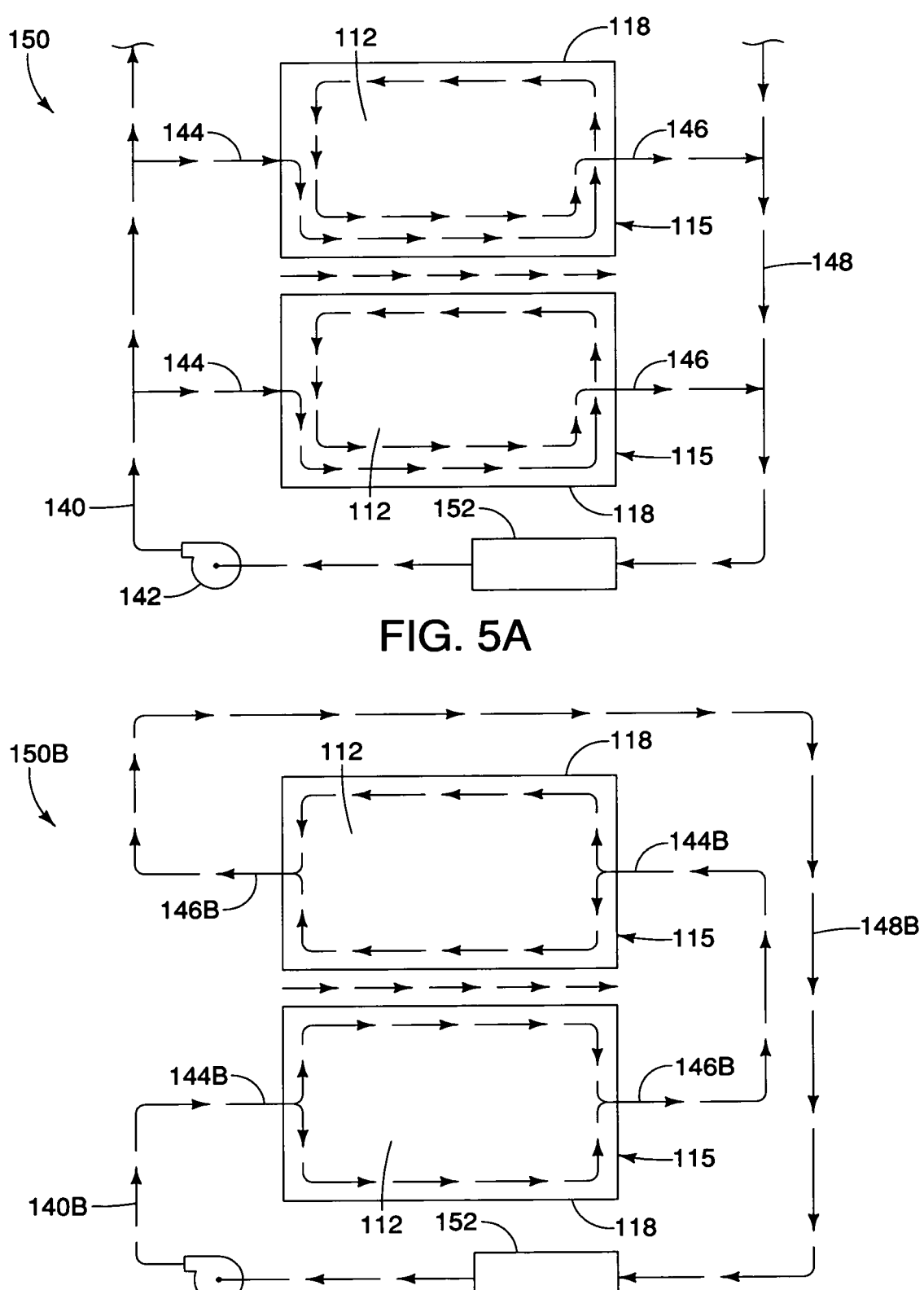
FIG. 5A is a plan view schematic of a coolant flow regime which can be used for the solar energy system of FIG. 2.
FIG. 5B is a plan view schematic of an alternate coolant flow regime which can be used for the solar energy system of FIG. 2.

Turning to FIG. 5A, a schematic diagram depicts one schema for flow of cooling fluid in a solar panel cooling system 150, following from FIGS. 3 and 4. The solar panel cooling system 150 includes a pump 142 which circulates a liquid coolant (such as ethylene glycol) through the cooling passages (126, FIG. 4) in the segments 117 of the solar panel support trays 118. The cooling system 150 depicted in FIG. 5A shows two solar panel subassemblies 115 (solar panel 112 and support tray 118), which receive the coolant which is distributed by the pump 142 via a main coolant supply line 140 which branches off (via separate coolant supply lines 144) to the various support trays 118. The flow of the coolant (which is depicted by dashed lines) to the various solar panel subassemblies 115 is thus provided in a parallel manner (i.e., each solar panel subassembly 115 is provided with coolant directly from the main coolant supply line 140). The directional coolant flow arrows shown for each solar panel tray 118 indicate that the coolant circulates one complete trip around the solar panel 112 from the coolant inlet line 144, and then a second trip halfway around the solar panel to the coolant outlet line 146 (and then into the common coolant return line 148). The coolant return line 148 flows to a heat exchanger 152 (where heat is extracted from the coolant), and then back to the coolant supply pump 142. The heat exchanger 152 can be any known type of heat exchanger for cooling a fluid, such as a forced air heat exchanger.

Turning to FIG. 5B, a simplified schematic diagram depicts an alternative flow regime for the flow of coolant (again, depicted by dashed lines) in a solar panel cooling system 150B. Whereas the flow of coolant to the solar panel subassemblies 115 in FIG. 5A is parallel flow (as described above), in FIG. 5B the flow to the solar panel assemblies is serial flow. That is, the coolant flows from the coolant supply line 140B to a first solar panel assembly coolant inlet 144B (bottom of figure), out of the first solar panel coolant outlet 146B, and into the second solar panel assembly coolant inlet 144B, and so on until the coolant flows out of the last solar panel subassembly 115 and into the coolant return line 148B. As can be seen, when the coolant enters the solar panel support tray 118, the coolant flows down both sides of the tray segments (117, FIG. 4) in parallel and then joins up again at the coolant outlet line 146B.

Returning to FIG. 3, as described above, the individual solar panel subassemblies 115 can rotate about the secondary (seasonal positioning) pivot mounts 120, while the entire solar panel assembly 110 can rotate about the primary pivot mounts 116 for time-of-day tracking. Accordingly, in order to allow coolant to flow to the solar panel support trays (118)

as described above (FIGS. 5A and 5B), the pivot mounts (116, 120) can be configured to allow flow of coolant through the pivot mounts, without the need to provide flexible external coolant lines (such as hoses and the like). Likewise, electrical energy generated by the solar panels (112), as well as electrical power for the solar panel positioners, can be routed through the pivot mounts (116, 120), avoiding the need for external cabling. Electrical rotary connectors (also known as slip rings) are well known in the art, as are fluid slip ring connectors. In fact, combination fluid and electrical slip rings are commercially available, and typically include a hollow central opening for fluid passage, which is surrounded by an outer electrical slip ring. One example of such a combination fluid/electrical slip ring is the fluid rotary union and electrical slip ring available from Dynamic Sealing Technologies, Inc. (DSTI) of Andover, Minnesota, US. Since these types of slip rings are readily available, they will not be shown specifically in the drawing figures of the present disclosure, nor described further unless related to additional functioning of the solar power systems described herein.

Figure 6:
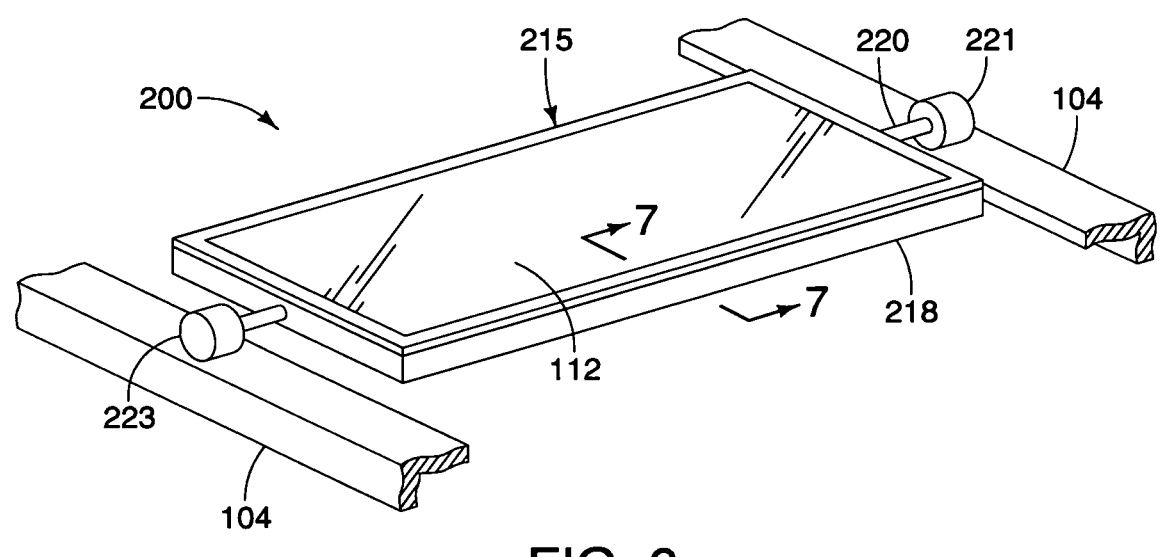
FIG. 6 is an isometric view of a solar panel cooling system.
Figure 7:
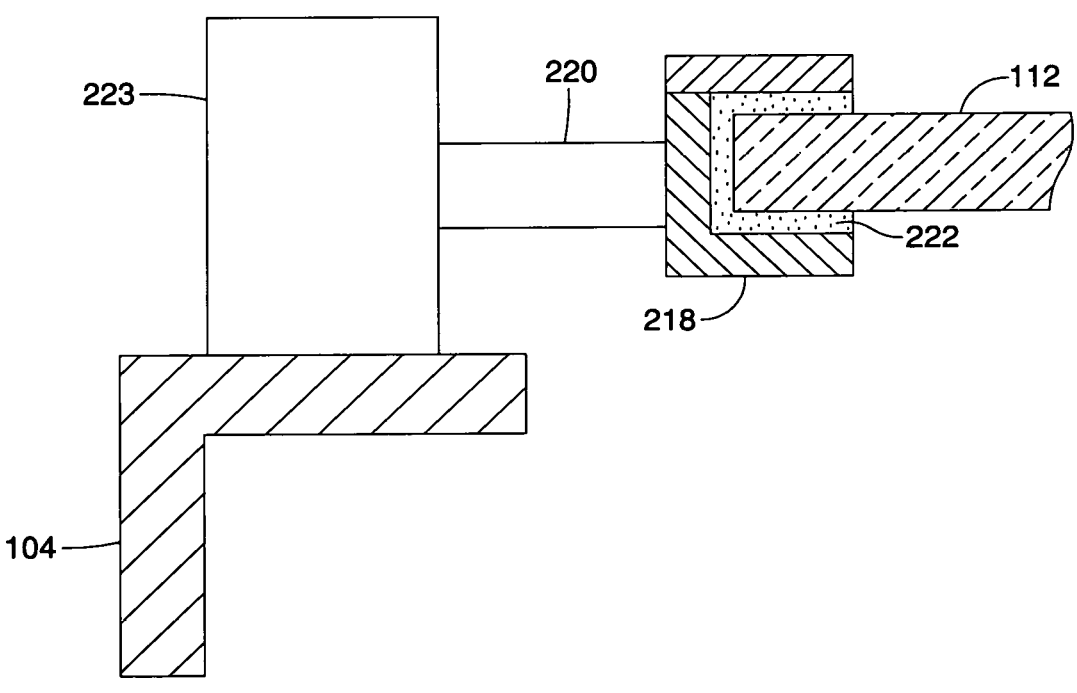
FIG. 7 is a side view of a heat transfer drum from the solar panel cooling system of FIG. 6.

Turning now to FIG. 6, a solar panel cooling system 200 is depicted in isometric view. The system 200 depicted in FIG. 6 is a passive cooling system in that there are no forced cooling fluids (such as forced air or pumped liquid coolant). The system 200 of FIG. 6 includes a solar panel assembly 215, having a single solar panel 112 which is supported by a solar panel support tray 218. The solar panel support tray 218 can be an open rectangular frame, similar to the support tray 118 of FIG. 3. The solar panel assembly 215 of FIG. 6 is generally similar to the solar panel assembly 110 of FIG. 1. As depicted in FIG. 6, the solar panel assembly 215 is supported by support trusses 104 (see also FIG. 1). More specifically, the solar panel assembly 215 is supported on a first end by pivot mount 220, which allows the solar panel tray 218 to be connected to the time-of-day positioned 221. The solar panel assembly 215 is further supported on a second end of the tray 218 by a heat transfer drum 223. The heat transfer drum 223 rests on the truss 104, and can allow the solar panel to rotate as moved by the positioner 221. In order to keep the heat transfer drum 223 from traveling along the truss 104 during rotation, the drum can be placed within a recess formed in the truss. Further, to reduce friction between the heat transfer drum 223 and the truss 104, a thermal (or thermally) conductive grease can be applied to the recess in which the drum rests on the truss. One example of a thermal grease is 3M Thermally Conductive Grease 2035, which is available from the 3M Company of Saint Paul, Minnesota, US. The thermal contact between the solar panel 112 and the truss 104 is depicted in the side view detail of FIG. 7. As shown in FIG. 7, the solar panel 112 can be received by the solar panel support tray 218, and a thermal glue 222 (similar to thermal glue 122 of FIG. 4) can be used to improve thermal contact between the solar panel 112 and the support tray 218.

Figure 8:
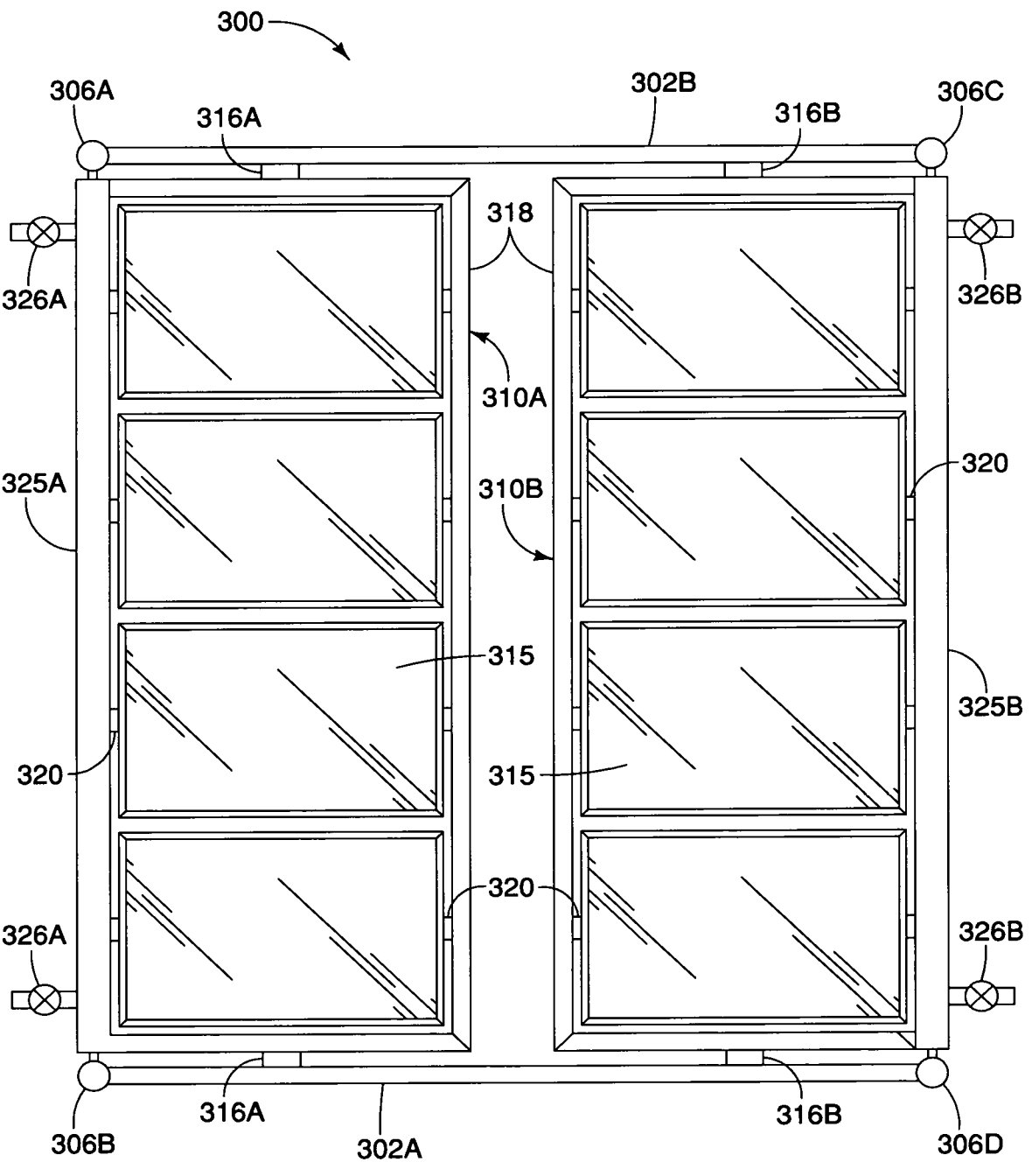
FIG. 8 a plan view of another solar panel cooling system.

Turning now to FIG. 8, a solar energy system 300 is depicted in plan view. The solar energy system 300 is generally similar to the solar energy system 100 of FIG. 1, and includes two solar panel assemblies (310A, 310B) which are supported by trusses 302A and 302B via primary pivot mounts (mounts 316A for panel assembly 310A, and 316B for panel assembly 310B). Each solar panel assembly (310A, 310B) includes a solar panel support tray 318 which supports one or more solar panels 315 pivotably supported in the tray by secondary pivot mounts 320, all in the manner described above with respect to solar panel assembly 110 of FIG. 3. The support trays 318 can be configured to receive a circulating coolant in the manner described above with respect to support tray 118 of FIG. 4. The solar panel assembly 310A is provided with an air-liquid heat exchanger 325A to cool the coolant circulating in the tray 318 of the solar panel assembly (and likewise, solar panel assembly 310B is provided with heat exchanger 325B). Heat exchanger 325A is provided with vent valves 326A, described more fully below (and heat exchanger 325B is similarly provided with vent valves 326B). Heat exchanger 325A is supported by support columns 306A and 306B, and heat exchanger 325B is supported by support columns 306C and 306D. Columns (or stanchions) 306B and 306D also support truss 302A, while columns (or stanchions) 306A and 306C support truss 302B.

Figure 9:
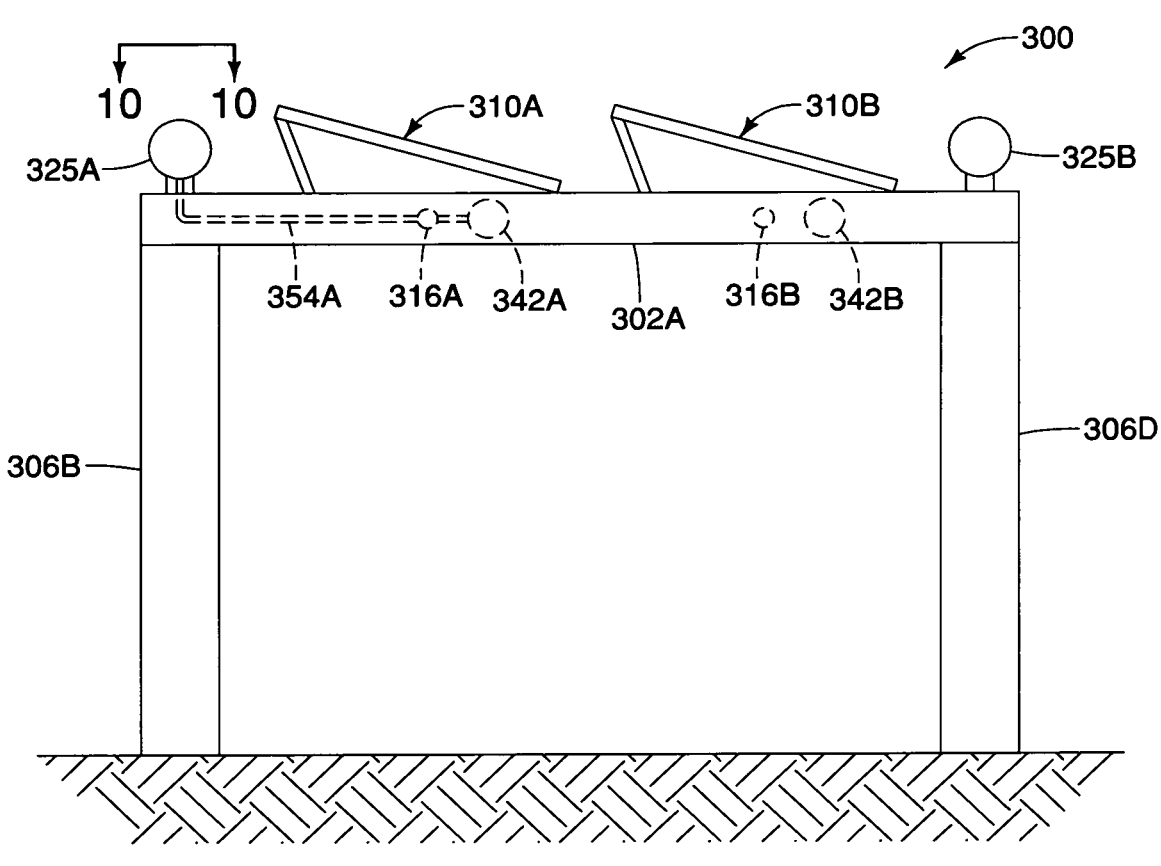
FIG. 9 is a front view of a solar energy system using the solar panel cooling system of FIG. 8.
Figure 10:
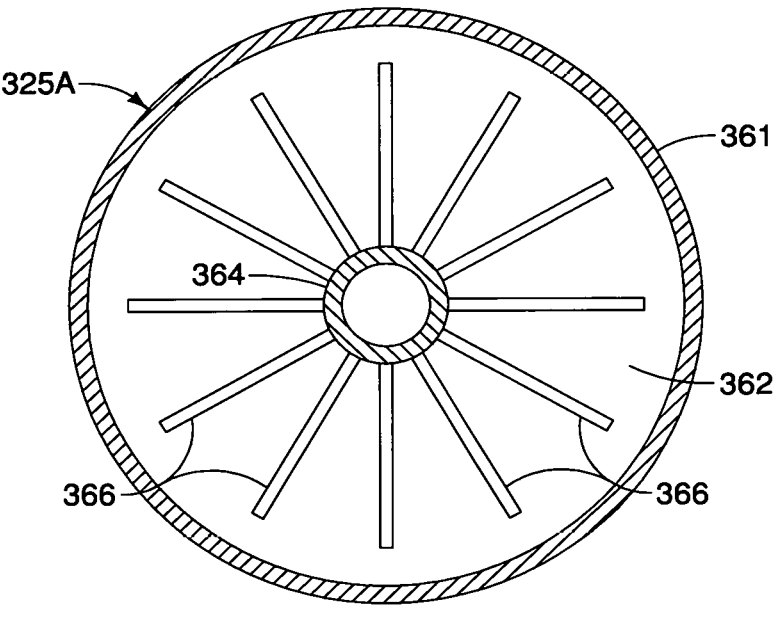
FIG. 10 is a cross section of a heat exchanger used in the solar panel cooling system of FIG. 9.

Turning to FIG. 9, the solar energy system 300 of FIG. 8 is depicted in front view. Here it can be seen how support columns 306B and 306D support truss 302A, as well as how heat exchanger 325A is supported by column 306B (and heat exchanger 325B is supported by column 306D). Also depicted in FIG. 9 are liquid coolant pumps 342A and 342B for respective solar panel assemblies 310A and 310B. A coolant transfer line 354A connects the coolant pump 342A to the heat exchanger 325A (and a similar coolant transfer line, not shown, connects pump 342B to exchanger 325B). FIG. 10 is a cross section of the air-liquid heat exchanger 325A. The heat exchanger 325A includes a liquid coolant line 364 which is generally disposed in the center of the outer shell 361 of the exchanger 325A. The liquid coolant line 364 can be provided with cooling fins 366 to increase transfer of heat from the coolant line to the interior 362 of the heat exchanger 325A. As will be described below, the air-liquid heat exchanger 325A can be configured to operate in a batch processing configuration to remove the need for a compressor to move air through the interior 362 of the heat exchanger 325A. In the batch processing mode, ambient air is admitted into the interior 362 of the exchanger and is held inside the exchanger until heated by the heat transfer fins 366 to a predetermined temperature, or pressure, at which time the heated air is then released (all as will be described further below). This configuration not only cools the solar panel assemblies (310A, 310B, FIG. 9), but can also be used to extract moisture from the atmosphere, also as described below.

Figure 11:
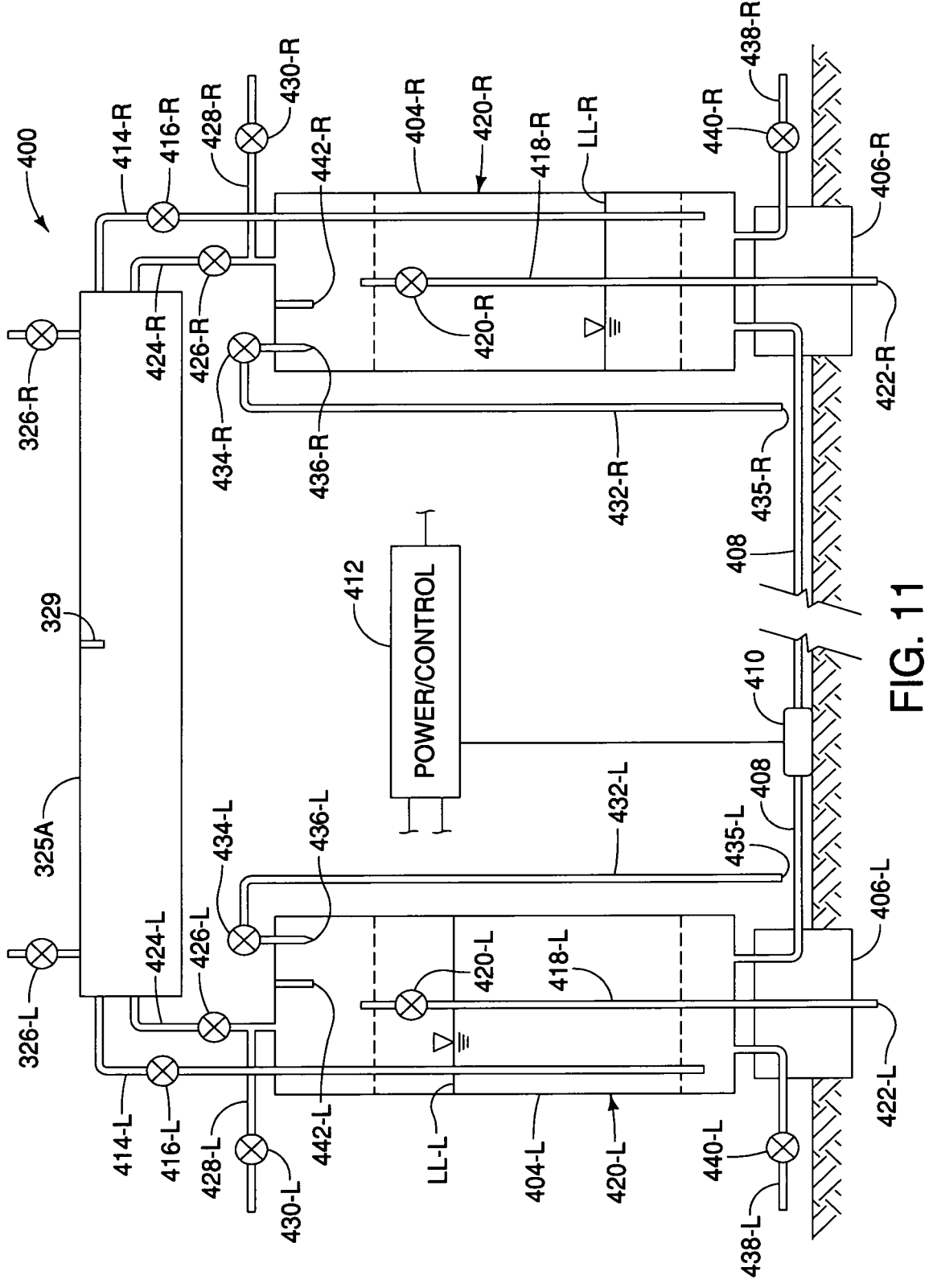
FIG. 11 is a side schematic view of an atmospheric moisture extraction system that can be used with the solar panel cooling system of FIG. 9.

Atmospheric moisture extraction system. FIG. 11 is a schematic diagram of an atmospheric moisture extraction system 400 which can be used with one or more of the solar energy systems described herein. In particular, the atmospheric moisture extraction system 400 can be used in conjunction with the solar energy system 300 of FIGS. 8 and 9 (described above), using the air-liquid heat exchanger 325A (also described above with respect to FIG. 10). The system 400 is able to recover moisture from the atmosphere by virtue of the energy which is transferred to air resident within the heat exchanger 325A from the liquid coolant which cools the solar panel assemblies (310A, FIG. 8), in the manner described further below. The moisture extraction system 400 includes two water piston units (402-L, 402-R) which are essentially mirror images of one another, thus rendering a general left-right symmetry of the system 400. Accordingly, in the following discussion, and in FIG. 11, components will be identified by a reference number, followed by either "-L" indicating a left side component, or "-R" indicating a right side component. I will also refer to components only by a reference number, indicating the generic component, or both components. Thus, the system 400 includes left side water piston unit 402-L, and right side water piston unit 402-R, together being the water piston units 402. Each water piston unit 402 can be housed in the support columns (e.g., 306A and 306B, FIG. 8) which support the underlying solar energy system. Thus, for example, water piston unit 402-L can be housed in support column 306A of FIG. 8, while water piston unit 402-R can be housed in support column 306B (FIG. 8). Each water piston unit 402 includes a cylindrical water recovery tank (404-L, 404-R) which each support a column of water. The columns of water in the water recovery tanks 404 act as water pistons, as will be described further below. The liquid water level in water recovery tank 404-L is indicated by "LL-L" (for "liquid level—left"), while the liquid water level in water recovery tank 404-R is indicated by "LL-R" (for "liquid level—right"). The water recovery tanks 404 are supported by respective foundations 406-L, 406-R, and the tanks (404-L and 404-R) are joined together in liquid fluidic communication by water piston transfer line 408. A water pump 410 can be disposed in the water piston transfer line 408 to facilitate transfer of water between the water recovery tanks 404, as will be described further below. Preferably the water pump 410 is an impeller pump (versus a positive displacement pump) so that the impeller can act as a mechanical brake on water flow through the water piston transfer line 408 under certain conditions (described below). I will now proceed with a description of the components of the atmospheric moisture extraction system 400, followed by a description of the operation of the system.

Still with reference to FIG. 11, the atmospheric moisture extraction system 400 includes a power and control unit 412 which provides electrical (or other) power to the automatic valves in the system (which are described below), as well as control signals to the valves and other components, sensor information, and signal processing. For the sake of simplicity of FIG. 11 the power and control unit 412 is shown as only being connected to the water pump 410, but it is understood that all other components which are intended to operate automatically are in power and/or signal communication with the power and control unit 412. As indicated above, the system 400 includes the air-liquid heat exchanger 325A which cools solar panels by transferring heat from a liquid coolant to air within the heat exchanger 325A. The heat exchanger 325A is provided with left and right hot air discharge lines (414-L, 414-R, respectively), which are provided with respective heat exchanger hot air release valves 416-L, 416-R. The hot air release lines 414-L, 414-R allow hot air from the heat exchanger 325A to be released into the respective water recovery tanks (404-L, 404-R) when the corresponding hot air release valves (416-L, 416-R) are opened. The hot air release valves are under the control of the power and control unit 412. Hot air is released from the heat exchanger 325A when a predetermine air temperature within the heat exchanger is detected by heat exchanger air temperature sensor 329 (which is in communication with the controller 412). (Alternately, hot air can be released from the heat exchanger 325A when a high pressure condition is detected, in which case the sensor 329 is a pressure sensor. Further, both temperature and pressure of air within the heat exchanger 325A can be monitored.) The hot air discharged from the heat exchanger 325 will typically be between 3 and 12 psi above atmospheric pressure, and the hot air discharge lines 414 can be configured to discharge the hot air below the liquid water level ("LL") in the water recovery tanks 404. The increase in air pressure within one of the water recovery tanks 404 (resulting from the release of hot, pressurized air from the heat exchanger into that tank) will cause water in that tank to be forced into the other water recovery tank via the water piston transfer line 408. In addition to the hot air discharge lines (414), the heat exchanger 325A is also provided with left and right heat exchanger cool air inlet lines (424-L, 424-R) which selectively allow cool air to enter the heat exchanger under the control of the respective heat exchanger cool air inlet valves 426-L and 425-R (which are under the control of the control unit 412). The heat exchanger cool air inlet lines 424-L, 424-R each draw cool air in from the upper portion of the respective water recovery tank 404-L, 404-R. Cool air is admitted into the water recovery tanks 404 by cool ambient air inlet lines 432, under the control of the cool ambient air control valves 434 (and control unit 412). Preferably the intake openings 435 of the ambient air intake lines 432 are located so as to draw in cool moist air when possible. Each ambient air intake line 432 terminates inside the respective water recovery tank 404 at an orifice 436 which causes a drop in pressure of the ambient air as it is admitted into the recovery tank. As described below, this drop in pressure precipitates water vapor in the ambient air into liquid water within the water recovery tank 404.

Still referring to FIG. 11, each heat exchanger cool air inlet line 424 is provided with an air pressure equalization line 428, which includes an air pressure equalization control valve 430 disposed therein. Each air pressure equalization line 428 is joined with the respective exchanger cool air inlet line 424 between the water recovery tank 404 and the exchanger cool air inlet control valve 426. The air pressure equalization control valves 430 are under the control of control unit 412. Further, each water recovery tank 404 can be provided with a liquid level sensor 442 to determine the liquid level "LL" within the tank. The water level information from the water level sensors 442 can be provided to the control unit 412 for processing. Additional instrumentation (not shown) can be provided for the water recovery tanks 404, such as internal air pressure and internal temperature. Each water recovery tank 404 is also provided with a water overflow discharge line 418, each water flow discharge line having a respective water overflow control valve 420 (under the control of control unit 412). Each water overflow discharge line 418 has an upper end (not numbered) inside the respective water recovery tank 404 to allow water to flow out of the tank and out through a recovered water discharge port 422. It is the water which flows out from the recovered water discharge ports 422 that is the moisture extracted from the atmosphere by the system 400 (as will be explained below). Each water recovery tank 404 is also provided with a fresh water charging line 438 having a respective water charging control valve 440 (each being under control of control unit 412). The fresh water charging lines 438 can be connected to further piping (not shown) to allow the water recovery tanks 404 to be drained if desired for servicing and the like. Likewise, recovered water from the recovered water discharge ports 422 can be transferred to other locations using piping and pumps not shown in FIG. 11. The recovered water should be relative pure water, being recovered from atmospheric water vapor. I will now describe an exemplary operation of the atmospheric moisture extraction system 400.

As a preliminary matter, while the atmospheric moisture extraction system 400 is being described with respect to a further system for the cooling of solar panels, it will be appreciated with the moisture extraction system 400 can be used in conjunction with any cooling system where heat is transferred to cool air. To begin operation of the system 400, the water recovery tanks 404 are first filled to about half way between their high level (top of overflow discharge lines 418) and low level (bottom of heat exchanger discharge line 414) operating ranges. This can be done by filling the individual tanks 404 from their respective fresh water charging lines 438 (using fresh water charging control valves 440), while venting air within the tanks via the air pressure equalization lines and related control valves (428, 430). (Air can also be vented from the tanks 404 through the heat exchanger 325A using the heat exchanger cool air inlet valves 426 and the heat exchanger atmospheric vent valves 326). Once the desired initial water level is reached in the tanks 404, the water pump 410 can be operated to flush any entrained air from the water piston transfer line 408. Alternately, the system 400 can be water primed by using only one of the fresh water charging lines and valves (438, 440), and routing water to the other tank 404 via the water piston transfer line 408. Once the water recovery tanks 404 are primed, the system 400 can be closed to prevent any transfer or air or water through any of the transfer lines. This is accomplished by closing all of the control valves 326, 416, 420, 426, 428, 434 and 440. At this time water transfer pump 410 is not running. As indicated above, in the system 400 the heat exchanger is operated as a static air heat exchanger—i.e., heat is transferred from the flowing coolant in the coolant line (364, FIG. 10) to static air in the air chamber (362, FIG. 10) of the heat exchanger 325A. During this heating cycle the air temperature in the heat exchanger 325A is monitored (by control unit 412) to determine when the air temperature reaches a predetermined high temperature. (During this time the air pressure within the heat exchanger 325A can also be monitored by a heat exchanger air pressure sensor (not shown in FIG. 11), and the heat exchanger can also be provided with an over-pressure relief valve (also not shown) to prevent over-pressuring of the heat exchanger. Further, as described above, rather than monitoring for a predetermined air temperature in the heat exchanger 325A, the heat exchanger can be monitored for a predetermined high pressure.)

Once the desired condition within the heat exchanger 325A is reached (i.e., a selected air temperature or a selected air pressure), the hot air within the heat exchanger 325A is released into one or the other of the water recovery tanks 404. For purposes of the following discussion, I will assume that the hot air is released initially into the left water recovery tank 404-L, although the selection of which tank (404-L, 404-R) to use initially is completely arbitrary. Hot air is released from the heat exchanger 325A by opening the heat exchanger hot air release valve 416-L. The hot air is expelled through the hot air discharge line 414-L into the lower portion of the left water recovery tank 404-L. (The discharge port of the hot air discharge line 414-L is submerged under the water level "LL-L" in the tank 404-L.) The discharged air bubbles up through the water column in the tank 404-L, and increases air pressure over the water column in the tank, forcing water from the left water recovery thank 404-L to flow through the water piston transfer line 408 and into the right water recovery tank 404-R. In order to allow the water from the left tank 404-L to move more easily into the right tank 404-R, the air pressure equalization control valve 430-R can be operated to allow a controlled release of air from the right tank 404-R. Air is released from the heat exchanger 325A through the left hot air discharge line 414-L until the water level in the left water recovery tank 404-L reaches a predetermined low level (near the bottom of the hot air discharge line 414-L, as determined by the left-side water level detector 442-L). During this time the water level in the right water recovery tank 404-R may exceed a preselected high level (near the top of the overflow discharge line 418-R, as determined by the right-side water level detector 442-R). When the right-side water level exceeds the preselected high level, then the right side water overflow control valve 420-R can be opened to release excess water through the water overflow discharge line 418-R. Once the desired low water level is reached in the left water recovery tank 404-L, then the left side hot air release valve 416-L is closed, the right side water overflow control valve 420-R is closed, and the right side air pressure equalization control valve heat exchanger 430-R is closed. This completes the release of hot air from the exchanger 325A at the left side water piston unit 402-A. The next step, described below, is recharging the heat exchanger (325A) with fresh cool air.

Following the release of hot air from the heat exchanger 325A, the heat exchanger is recharged with cool ambient air. This process also results in the recovery of water vapor from the atmosphere as a liquid in the water recovery tanks (404). Specifically (and continuing the discussion from the paragraph immediately above), the right cool ambient air control valve 434-R is opened which allows cool ambient air to be drawn in through the cool ambient air inlet line 432-R. Also at this time the left side heat exchanger cool air inlet valve 426-L is opened to control descent of the water column in the right side water recovery tank 404-R. Further, at this same time the heat exchanger atmospheric vent valve 326-R is opened to allow any residual hot air in the heat exchanger 325A to be flushed from the heat exchanger by air within the left side water recovery tank 404-L. (The air in the left side tank 404-L has been cooled by bubbling it though the water column during the hot air discharge step, described above.) This movement of air through the system 400 continues until the liquid level "LL" in both water recovery tanks 404 is approximately even at a generally mid-level position in the tanks. Notably, as cool ambient air is discharged from the right side orifice 426-R, water vapor within the incoming cool ambient air condenses as liquid water and is precipitated into the water recovery tank 404-R. Once pressure within the system equalizes (and no more air movement is occurring) then all of the valves that have been opened for the air intake step are closed. The cool air within the heat exchanger 325A then begins to heat up due to the liquid coolant in the liquid coolant transfer line (364, FIG. 10). Once the air within the heat exchanger 325A reaches the predetermine heated level (as determined either by air temperature or air pressure), the air is released from the exchanger in the manner described above, but this time using the right side water piston unit 402-R. This process (of cycling between the left and right side water piston units 402-L and 402-R to receive the hot air from the exchanger 325A) continues as long as instructed by the power and control unit 412. During each cycle water is recovered from the ambient air into the water recovery tanks 404 and is extracted from the tanks via the water overflow discharge lines 418.

Figures 12A, 12B, 12C, 12D:
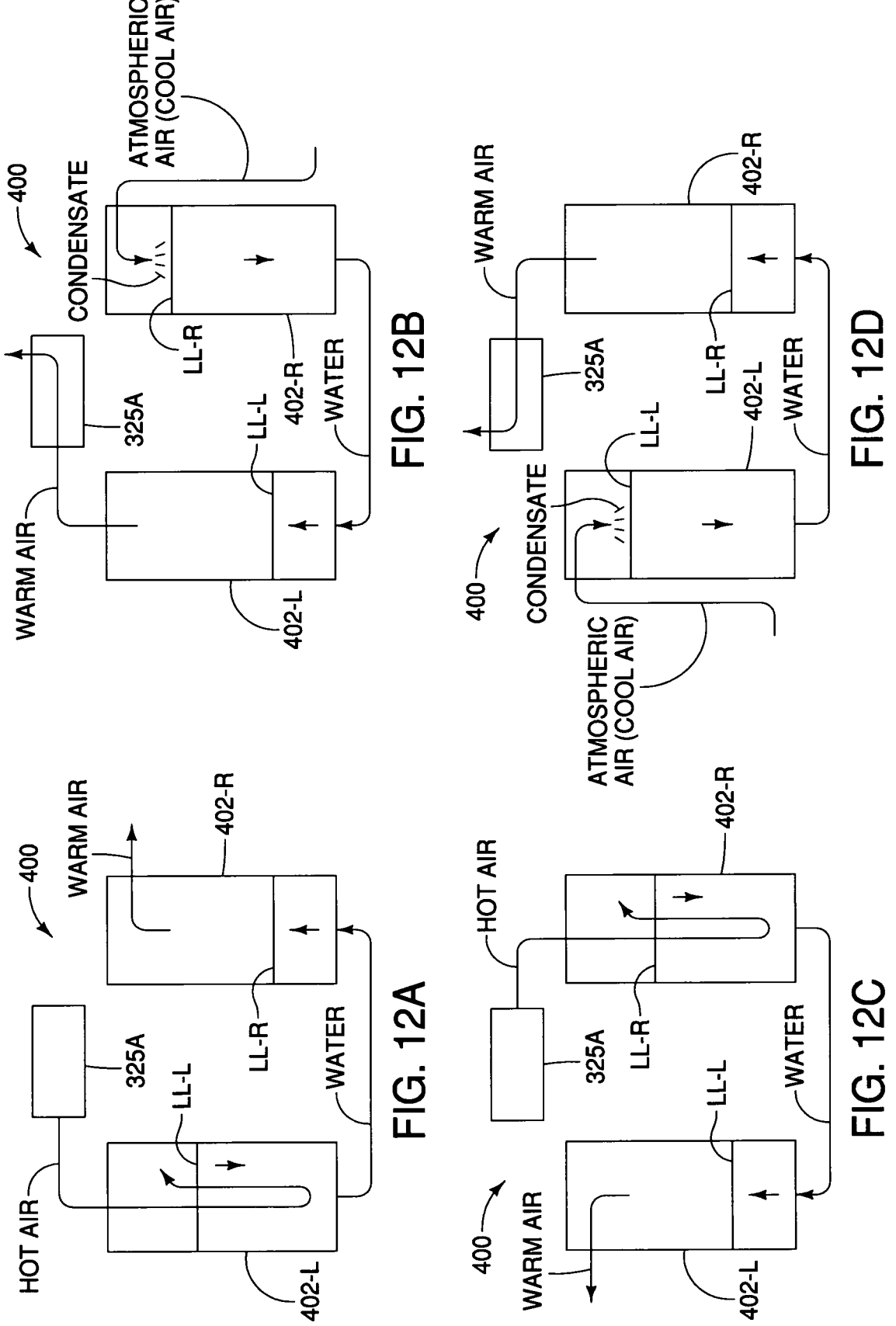
FIGS. 12A through 12D are sequential schematic flow diagrams of air and water transfers using the atmospheric moisture extraction system of FIG. 11.

FIGS. 12A through 12D are sequential schematic flow diagrams of air and water transfers using the atmospheric moisture extraction system of FIG. 11. The schematics of FIGS. 12A through 12D are simplified in that the various valves and lines depicted in FIG. 11, and described above, have been omitted from FIGS. 12A-12D. Accordingly, the only equipment depicted in FIGS. 12A-12D are the heat exchanger 325A and the two water piston units (402-L and 402-R). The sequence depicted in FIGS. 12A-12D includes four primary steps—two steps of hot air release from the heat exchanger 325A (per FIGS. 12A and 12C), and two steps of atmospheric air intake and moisture extraction (per FIGS. 12B and 12D). It will be appreciated that the heat exchanger hot air release steps depicted in FIGS. 12A and 12C are essentially mirror images of one another, as are the atmospheric air intake steps of FIGS. 12B and 12D. The four steps depicted in FIGS. 12A-12D make up one complete cycle of operation of the cooling and moisture extraction system 400. A fifth step in the process, not specifically depicted in FIGS. 12A-12D, is a step of heating static air in the heat exchanger 325A between the steps depicted in FIGS. 12B and 12C. Further, following step 12D, a sixth step (not shown) includes shutting all valves and letting the air in the heat exchanger 325A heat to the desired temperature (or pressure) before being released again at step 12A. Thus, the over all process includes six steps, as follows: (a) release hot static air from heat exchanger (325A) through left side water piston unit (402-L), while venting air from the right water piston unit (402-R) to atmosphere; (b) draw in fresh air at right side water piston unit (402-R) while releasing air from left side water piston unit into heat exchanger (and venting the heat exchanger at the right end); (c) close all valves and let the air in the heat exchanger heat up; (d) release hot static air from heat exchanger through right side water piston unit, while venting air from the left water piston unit to atmosphere; (e) draw in fresh air at left side water piston unit while releasing air from right side water piston unit into heat exchanger (and venting the heat exchanger at the left end); and (f) close all valves and let the air in the heat exchanger heat up. These steps are repeated as long as heat is available from the heat exchanger to drive the cycle (or until terminated by intervention).

Beginning with FIG. 12A, hot air is released from the heat exchanger 325A into the left water piston unit 402-L. As the hot air enters the left water piston unit 402-L, the left water level "LL-L" is driven downward and water from the left water piston unit 402-L is pushed into the right water piston unit 402-R. In order to allow the water to enter the right water piston unit 402-R (and allow the water level LL-R to rise), air is vented from the right water piston unit to the atmosphere (indicated as "WARM AIR" in FIG. 12A). Once the venting of air from the heat exchanger 325A to the left water piston unit 402-L is complete, then the associated valves (see FIG. 11) are closed. It will be noted that during the release of hot air from the heat exchanger 325A to the left water piston unit 402-L, the heat exchanger is not otherwise vented, and thus some residual air pressure will remain in the heat exchanger, as well as within the left water piston unit 402-L, once flow of air from the heat exchanger to the water piston unit 402-L ceases. Thus, there will be an air pressure difference between the left and right water piston units (402-L, 402-R), allowing the water level LL-R in the right water piston unit to be higher than the water level LL-L in the left water piston unit. Further, it will also be noted that the hot air from the heat exchanger 325A is bubbled through the water in the left water piston unit 402-L, thus cooling the air above the water level LL-L. Moving now to FIG. 12B, the diagram depicts the replenishment of cool air to the heat exchanger 325A, and the recovery of liquid water from atmospheric air into the right water piston unit 402-R. Specifically, the vent valve 326-R (FIG. 11) is opened to allow the warm air in the left water piston unit 402-L to flow through the heat exchanger 325A and vent to the atmosphere. This venting of the air via the heat exchanger 325A reduces the air pressure in the left water piston unit 402-L, allowing the water from the right water piston unit 402-R to flow into the left water piston unit. (Recall that after venting the hot air from the heat exchanger 325A into the left water piston unit 402-L, the water level in the right water piston unit 402-R will be higher than the water level in the left unit, creating a water piston effect.) Still referring to step 12B, in order to allow the water to flow from the right water piston unit 402-R to the left water piston unit 402-L, cool ambient air control valve 434-R (FIG. 11) is opened, allowing cool ambient air to flow into the upper portion of the right water piston unit. As described above with respect to FIG. 11, as this atmospheric cool air enters the right water piston unit 402-R, the orifice (436-R, FIG. 11) causes water vapor in the air to condense into liquid water and precipitate into the right water piston unit. Under the water piston effect, at the end of the step depicted in FIG. 12B the water levels LL in both water piston units should be the same. However, at this point the water transfer pump 410 (FIG. 11) can be used to transfer more water from the right water piston unit 402-R to the left water piston unit 402-L and thus create a water pressure differential condition between the bottoms of the two water piston units 402. Following the step depicted in FIG. 12B, the system 400 is closed (no flow of water or air in any of the components) in order to allow the air within the heat exchanger 325A to heat to the predetermined level (i.e., temperature or pressure).

Moving on to the step depicted in FIG. 12C, once the air within the heat exchanger 325A has been heated to the predetermined level, it is released into the right water piston unit 402-R. As described above, the step depicted in FIG. 12C is merely the mirror image of the step depicted in FIG. 12A—i.e., hot air is released into the right unit 402-R, versus the left unit 402-L. It will be noted that as the hot air from the exchanger 325A rises through the water in the right water piston unit 402-R (and is thus cooled by the water), the air mingles with the cool ambient air drawn into the right unit in step 12B and is thus cooled further. This cooled air will be the air that is provided to the heat exchanger 325A as replenishment air in the step depicted in FIG. 12D, thus making the heat exchange process in the heat exchanger more efficient. Following the release of the hot air from the exchanger as depicted in FIG. 12C, the heat exchanger 325A is flushed with the cooled air in step 12D, and water vapor from atmospheric air introduced into the left water piston unit 402-L is recovered in that unit. Following the step of FIG. 12D, the system is closed, air is heated in the heat exchanger 325A, and the process begins again at step 12A. As described above with respect to FIG. 11, excess water recovered from the atmosphere can be removed from the water piston units 402 via the water overflow discharge lines 418.

Following from FIGS. 12A-12D, and the description above, one method of operating the atmospheric moisture extraction system 400 can be summarized as follows (in sequential order, and assuming the system 400 has been primed, as discussed further below):

Heat static air in a heat exchanger (325A) with a coolant that is to be cooled.

Release the heated air from the heat exchanger into a first water piston unit (e.g., 402-L).

While releasing air from the heat exchanger into the first water piston unit, allow water to flow from the first water piston unit (e.g., 402-L) to a second water piston unit (e.g., 402-R), while at the same time venting air from the second water piston unit to the atmosphere.

Once air no longer moves from the heat exchanger to the first water piston unit, allow cool atmospheric (or ambient) air into the second water piston unit while at the same time allowing water to move from the second water piston unit to the first water piston unit, and also allowing air to move from the first water piston unit into and through the heat exchanger, and allowing excess air to vent from the heat exchanger to the atmosphere.

As part of allowing cool ambient air into the second water piston unit, this includes passing the ambient air through an orifice placed within the second water piston unit to precipitate water vapor from the atmospheric air into liquid water within the second water piston unit.

Once cool atmospheric air no longer moves into the second water piston unit, isolate the system so that air and water are not transferred between any of the heat exchanger or the water piston units.

Repeat the step of heating static air within the heat exchanger.

Release the heated air from the heat exchanger into the second water piston unit (e.g., 402-R).

While releasing air from the heat exchanger into the second water piston unit, allow water to flow from the second water piston unit to the first water piston unit, while at the same time venting air from the first water piston unit to the atmosphere.

Once air no longer moves from the heat exchanger to the second water piston unit, allow cool atmospheric (or ambient) air into the first water piston unit while at the same time allowing water to move from the first water piston unit to the second water piston unit, and also allowing air to move from the second water piston unit into and through the heat exchanger, and allowing excess air to vent from the heat exchanger to the atmosphere.

Repeat the above entire sequence so long as desired while heat from the heat exchanger is available, and water vapor is available for extraction from the atmosphere.

Recover surplus condensed atmospheric moisture from the water piston units to ensure a vapor space is available above the liquid level in each unit.

As previously indicated, the above summary of the steps of operating the atmospheric moisture extraction system 400 of FIG. 11 (and as exemplified in FIGS. 12A-12D) assumes that the system 400 has been primed. Specifically, since the system 400 will typically not be operational at night, the system needs to be primed at the start of solar power generation the following morning. Priming the system 400 essentially entails ensuring that there is water in the water piston units 402, and if there is insufficient water, then additional water can be added to the water recovery tanks 404 using the water charging control valves 440. Priming the system 400 can also include ensuring that the water levels LL-L and LL-R are at different heights to provide a water piston effect between the two water piston units 402-L and 403-R. This can be done using the water transfer pump 410 and the water transfer line 408 (along with appropriate venting of air from the water recovery tank 404 which is to have the higher water level). Priming the system 400 can further include pumping water back and forth between the two water recovery tanks 404 while venting stale air in the tanks, and drawing in fresh air (from the cool ambient air inlet lines 432) in order to charge the water piston units with cool fresh air. This last step can additionally include using the water pistons (i.e., water in the water piston units 402) to pump fresh cool ambient air into the heat exchanger 325A via the heat exchanger cool air inlet valves 426.

The above summary of a method of operating the atmospheric moisture extraction system 400 is but one example. Other methods of operating the system 400 can also be performed. For example, the water transfer pump 410 (FIG.

11) can be used to move additional water into a water piston unit during the atmospheric air intake step (FIG. 12B), as described above. It will also be appreciated that the steps described in the above summary include the implied steps of opening and closing various of the valves described in FIG. 11 in order to allow the described flows to take place. It will be understood that when no flow is being described, then the various valves are closed to avoid any inadvertent flow. Further, the apparatus of the atmospheric moisture extraction system 400 of FIG. 11 is but one example, and variations on the apparatus can be made, all in the spirit of enabling the operation of the cycle as generically depicted in FIGS. 12A-12D. For example, rather than removing excess water from the water recovery tanks 404 using the water overflow discharge lines 418, the excess water can be removed via a water permeable membrane and used for evaporative cooling of another system (e.g., to further cool the solar panels 112). Also, other features can be added to the apparatus of the system 400. For example, a particulate filter can be added to the cool ambient air inlet lines 432 to keep the water in the water recovery tanks 404 clean. In another example the water overflow discharge lines 418 can be routed to a thermal heat sink consisting of a water permeable block material (such as porous concrete) placed within a below-grade holding cell. When such a heat sink is available, the cool ambient air inlet lines 432 can draw the fresh air from a location within the heat sink to provide air for the system 400 which has a temperature lower than the general ambient air temperature.

As indicated above, the various air valves in the system 400 of FIG. 11, as well as the recovered water transfer pump 410, are under the control of the power and control unit 421. Preferably the various control valves of the system 400 can allow for various valve opening positions (rather than being of the full-open-or-full-close type valve) in order to control the air transfer and water recovery process (i.e., to control the rate of flow of air and water through the system). Specifically, the rate at which hot air is released from the heat exchanger 325B into the water recovery tanks 404 can be controlled by the heat exchanger hot air release valves 416. Likewise, the rate at which air is vented from the water recovery tanks 404 can be controlled by the air pressure equalization control valves 430. Also, the rate at which cool atmospheric air is admitted into the water recovery tanks 404 can be controlled by the cool ambient air control valves 434, and/or the heat exchanger cool air inlet valves 426. Additionally, the rate of water transfer between the water recovery tanks 404 can be controlled by using the water transfer pump 410 as a water brake. The specific selection of air flow rates in order to optimize water recovery (or transfer of hot air) are design choices, and will be influences by atmospheric humidity, atmospheric air temperature, and the operating parameters of the heat exchanger 325A.

Again referring to FIG. 11, if ambient temperatures are expected to drop below freezing, and in the absence of any heating system within the water recovery tanks 404, then it can be desirable to drain the water recovery tanks to prevent damage from freezing of the water therein. Further, is can be desirable to drain the water recovery tanks 404 for service (such as cleaning) and repairs. Draining the water from the water recovery tanks 404 can be done using a separate water drain valve (not shown) which can be manifolded into the water make up lines 438, or into the water transfer line 408.

Returning to FIG. 1, the solar energy system 100 is depicted as being placed over a street "S". The configuration of the solar energy system 100 lends itself in particular to being deployed over infrastructure corridors such as streets, highways, rail lines, utility (power line) right of ways, pipelines and other infrastructure where a continuous clear path is provided. One advantage of placing the solar energy system along infrastructure corridors is that such corridors typically have existing electrical power lines along the corridors (which can be used to collect power from the solar arrays). Another advantage is that such corridors are easily accessible for maintenance of the solar energy system via existing roads, rails and/or service right-of-ways, thus significantly reducing (or even eliminating) new access infrastructure (and associated permitting and cost) required for the solar energy system. These utility corridors are long—hundreds of miles in many cases—and so a very large number of solar panels can be placed along the corridors with minimal site preparation.

Figure 13:
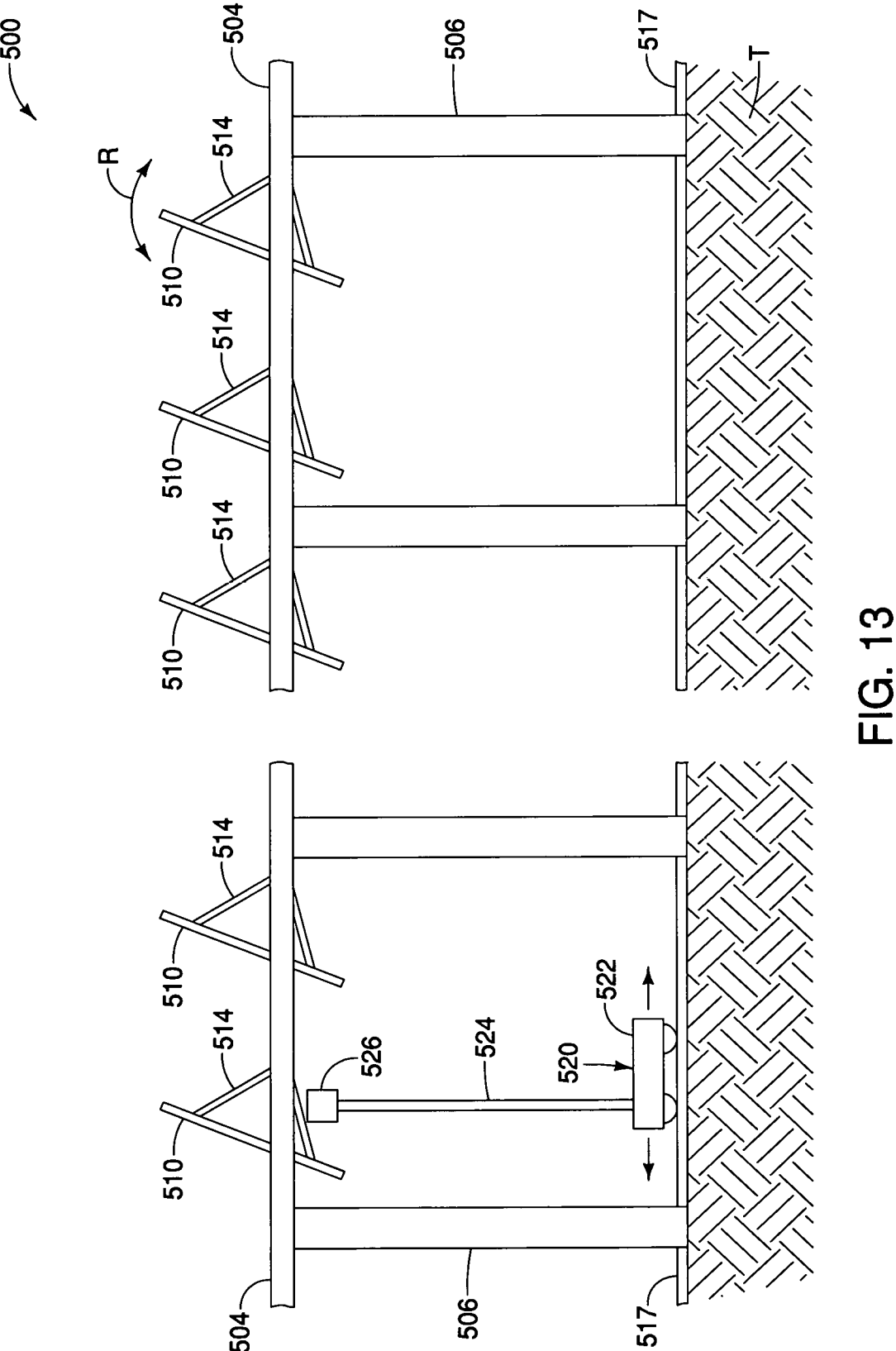
FIG. 13 is a side view of a solar energy system deployed along an infrastructure corridor.

Turning now to FIG. 13, a solar energy system 500 is depicted in side view as being placed along an infrastructure corridor such as a rail line. (No rail lines are depicted in FIG. 13, but they will be supported by the terrain "T" and run parallel to the service track 517, described below.) The solar energy system 500 includes a large number of solar panel assemblies similar to the system 100 of FIG. 1. In FIG. 13 only two complete assemblies are depicted for the sake of simplicity, but it will be appreciated that the system 500 can be extended many miles in both directions (to the left and to the right). The solar energy system 500 includes stanchions 506 which support trusses 504. It will be appreciated that a parallel system of stanchions and trusses is placed across from the stanchions (506) and trusses (504) depicted in the figure, to thus crease a series of rectangular assemblies similar to the single assembly depicted in plan view in FIG. 8. The system 500 (FIG. 13) includes solar panel arrays 510 which can be similar to the solar panel array 110 of FIG. 3. Each solar panel array 510 (FIG. 13) is supported by a solar panel support frame 514 which is pivotally supported between two trusses 504—i.e., the solar panel arrays 510 extend into the sheet of the drawing (FIG. 13) and are supported both by the trusses depicted in the figure as well as by parallel trusses on the opposite side of the solar panel array 510 (again, similar to the arrangement depicted in plan view in FIG. 8). In one variation the solar panel arrays 510 can be repositioned by ninety degrees (similar to the arrangement in FIG. 2) to better align the panels with the trajectory of the sun—i.e., the solar panel arrays 510 can be parallel to the trusses 504, as opposed to perpendicular as depicted in FIG. 13. The solar panel arrays 510 can rotate in direction "R" to track the sun during the day, and can also have seasonal positioners (as described above with respect to FIG. 3). Still referring to FIG. 13, the solar energy system 500 can be provided with an autonomous service robot 520. As depicted in FIG. 13, the service robot 520 rides on rails 517, although the service robot can ride directly on the terrain "T" or on a road surface (if available). The rails 517 of FIG. 13 can be exclusive to the service robot 520, or they can be existing rails such as for trains and rail transit. The service robot 520 includes a body 522 which can house rechargeable batteries to move the robot along the rails 517, and a deployable service mast 524 which terminates in a service module 526. The service module 526 can be used for a number of different services, for example: (a) as a water spray head to wash the solar arrays 510; (b) as a contactless magnetic positioner to move the solar panels throughout the day to track the sun; and (c) as a wireless telemetry device to poll solar arrays for performance and any problems. The service robot 520 can be parked at periodic charging stations (not shown) along the service rails 517, and the charging stations can be powered by electrical energy generated by the solar energy system 500. The solar energy system 500 can include an atmospheric moisture extraction system 400 (FIG. 11) between each of the stanchions 504. The liquid water recovered by the atmospheric moisture extraction systems can then be accessed by the service robot 520 and used to periodically wash the solar arrays 510.

Figure 14:
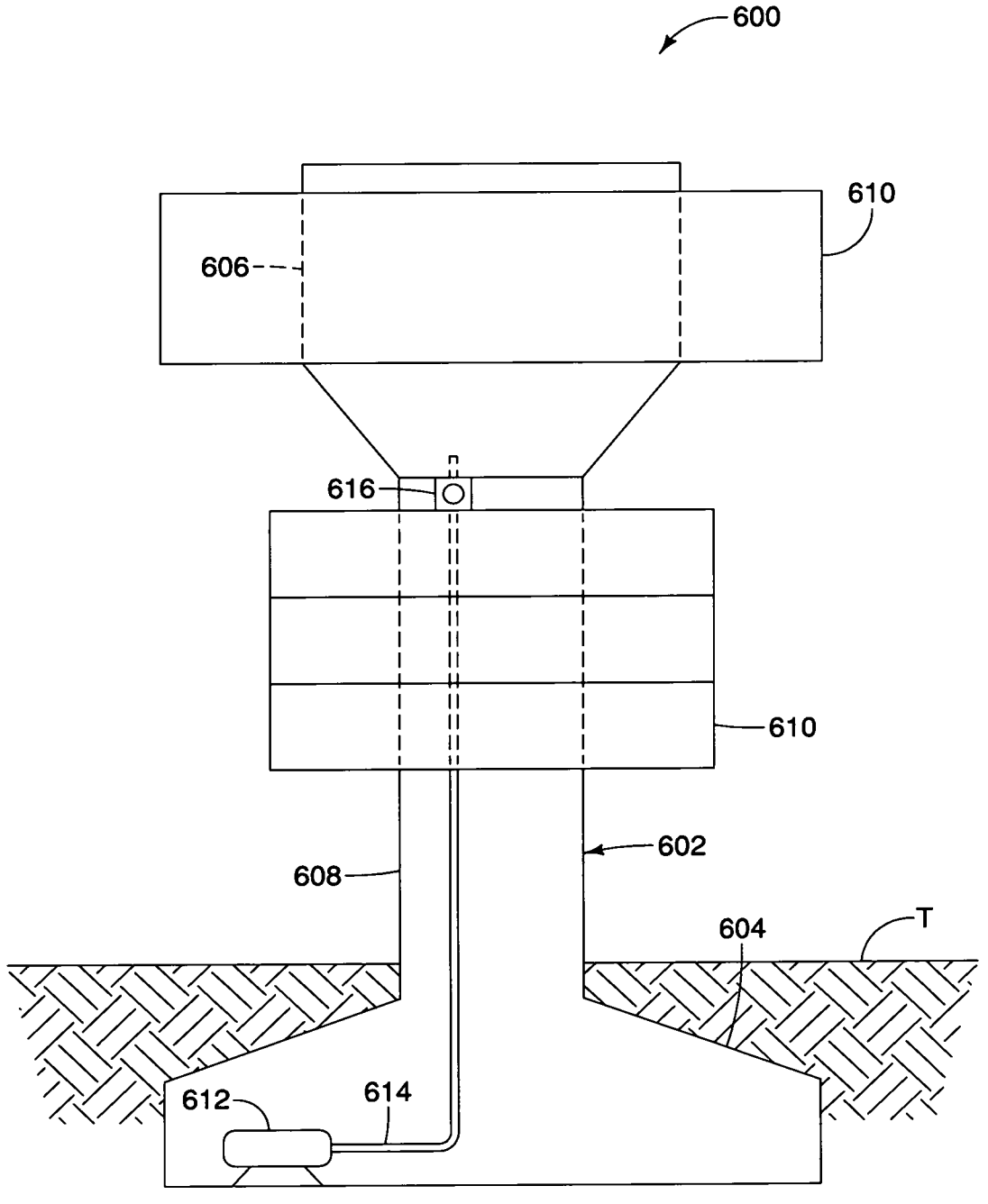
FIG. 14 is a side view of a solar power storage system.

Solar Energy Storage System. Turning now to FIG. 14, a solar energy storage system 600 is depicted in side view. Since the generation of solar energy is dependent upon the sun shining, there can be periods (particularly at night) when solar energy panels generate little or no electrical power. Accordingly, it is desirable to store solar energy generated during peak power generation periods for use later or when the power generated by the solar panels does not meet demand for the power. One method of storing electrical power generated by solar energy systems is by the use of batteries. Another method is by the use of the hydraulic power generation system 600 of FIG. 14. The power storage system 600 includes a vertical structure 602 having a subterranean water storage tank 604, and upper water storage tank 606, and a central column section 608 separating the upper and lower water storage tanks. The vertical structure 602 can be supported on terrain "T", with the lower water storage tank 604 disposed at least partially underground. The vertical structure 602 (including the water tanks 604, 606) can be fabricated from reinforced concrete. An exemplary overall height of the vertical structure 602 is 500 feet, with exemplary water storage capacities for each of the water tanks (604, 606) being 10 million gallons. The energy storage system 600 includes a water pump 612, here depicted as a submersible pump disposed within the lower water storage tank 604. The water pump 612 can transfer water from the lower water tank 604 to the upper tank 606 via the water transfer line 614. A check valve 616 can be used to hold the water in the upper tank 606. During periods of high solar power generation, the water pump can pump stored water from the lower tank 604 to the upper tank 606, thus transferring the electrical solar power (used by the pump) to potential energy (due to the hydrostatic head of the water in the upper storage tank). During periods when generated solar power is insufficient to meet demand, then water can be released from the upper tank 606 to the lower tank 604, passing through an electricity generating water turbine along the way to generate electrical power. The water turbine can be incorporated into the pump 612 (as a combination pump/turbine unit), or it can be a separate unit. Likewise, a water release control valve can be incorporated into the check valve 616 as a universal two-way water control valve, or it can be provided as a separate unit. A benefit of the vertical structure 602 is that is can be used as the core of a high rise building to support commercial and residential spaces 610, depicted here as being placed around the central column section 608 and the upper water storage tank 606.

The preceding description has been presented only to illustrate and describe exemplary methods and apparatus of the present invention. It is not intended to be exhaustive or to limit the disclosure to any precise form disclosed. Many modifications and variations are possible in light of the above teaching. It is intended that the scope of the invention be defined by the following claims.

I claim:
1. A solar energy system, comprising:
a solar array comprising a plurality of solar panels, each solar panel comprising a plurality of photovoltaic cells, and each solar panel being supported by a solar panel support tray, and wherein:

each solar panel support tray is fabricated from a thermally conductive material, and is in contact with the solar panel supported by the tray, to allow heat to flow from the solar panel supported by the tray to the tray; and each solar panel support tray defines a hollow cooling fluid passageway to allow a cooling fluid to convect heat away from the tray;

the system further comprising:

a support structure for supporting the solar panel support trays; and a solar panel cooling system, the solar panel cooling system comprising:

a static heat exchanger to transfer heat from the cooling fluid to air within the heat exchanger;

a pump to circulate the cooling fluid from the cooling fluid passageways in the solar panel support trays to and through the heat exchanger; and an atmospheric moisture extraction system, comprising:

a first water piston unit and a second water piston unit;

a water transfer line placing the first and second water piston units in liquid communication with one another;

a first heat exchanger hot air discharge line and a second heat exchanger hot air discharge line, and associated respective first and second heat exchanger hot air release valves, to allow static air to be selectively released from the static heat exchanger to the associated and respective first and second water piston units;

a first air pressure equalization control valve and a second air pressure equalization control valve to allow air to be selectively released from the respective first and second water piston units to an ambient atmosphere;

a first heat exchanger cool air inlet line and a second heat exchanger cool air inlet line, and associated respective first and second heat exchanger cool air inlet valves, to allow air from the respective first and second water piston units to be selectively released to the static heat exchanger;

a first heat exchanger atmospheric vent valve and a second heat exchanger atmospheric vent valve, the first and second heat exchanger atmospheric vent valves being disposed at respective opposite ends of the static heat exchanger to allow air to be selectively released from the static heat exchanger;

a first cool ambient air inlet line and a second cool ambient air inlet line, and associated respective first and second cool ambient air control valves, to allow ambient air to be drawn selectively into the respective first and second water piston units;

a first orifice disposed on the respective first cool ambient air inlet line inside the first water piston unit to precipitate moisture from incoming ambient air into liquid water within the first water piston unit, and a second orifice disposed on the respective second cool ambient air inlet line inside the and second water piston unit to precipitate moisture from incoming ambient air into liquid water within the second water piston unit.

2. The solar energy system of claim 1 and further comprising first and second water overflow discharge lines and associated first and second water overflow control valves to allow release of excess water from the respective first and second water piston units . . .

3. The solar energy system of claim 1 and wherein the support structure comprises first and second stanchions, and wherein the first and second water piston units are contained within the respective first and second stanchions.

4. The solar energy system of claim 1 and further comprising solar panel support frames to support the solar panel support trays, the solar panel support frames being supported by the support structure.

5. The solar energy system of claim 4 and further comprising a solar panel time-of-day positioner to rotate the solar panel support frames relative to the support structure.

6. The solar energy system of claim 5 and further comprising a solar panel season positioner to rotate the solar panel support frames in a position orthogonal to a direction of rotation performed by the solar panel time-of-day positioner.

7. The solar energy system of claim 4 and wherein the solar panel support frames are configured to rotate at least 270 degrees relative to the support structure.

8. The solar energy system of claim 1 and wherein the solar panels are bi-facial solar panels.

9. The solar energy system of claim 1 and further comprising a control unit to control the sequence of operation of the first and second heat exchanger hot air release valves, the first and second air pressure equalization control valves, the first and second heat exchanger cool air inlet valves, the first and second heat exchanger atmospheric vent valves and the first and second cool ambient air control valves.

10. The solar energy system of claim 9 and further comprising at least one of a pressure sensor and a temperature sensor to sense associated pressure and temperature of air in the heat exchanger, the at least one pressure sensor and temperature sensor in signal communication with the control unit.

11. The solar energy system of claim 9 and further comprising:

first and second water overflow discharge lines and associated first and second water overflow control valves to allow release of excess water from the respective first and second water piston units;

first and second water level sensors disposed within the respective first and second water piston units, the water level sensors being in signal communication with the control unit; and wherein the control unit is configured to open the first and second water overflow control valves in response to a detected high water level in the respective first and second water piston units.

12. The solar energy system of claim 9 and wherein the control unit is configured to regulate the first and second air pressure equalization control valves to regulate the release of air from the heat exchanger through the respective second and first heat exchanger hot air release valves.

13. The solar energy system of claim 1 and further comprising a thermal adhesive disposed between the solar panels and the associated solar panel support trays.

14. The solar energy system of claim 1 and wherein:

the first and second water piston units comprise respective first and second water recovery tanks, each water recovery tank defined by and upper end and a lower end; and the first and second heat exchanger hot air discharge lines extend inward of, and proximate the lower ends of, the respective first and second water recovery tanks.

15. The solar energy system of claim 1 and wherein:

each water piston unit is defined by an upper and an a lower end, the water piston units being mounted on a ground surface at the lower ends thereof; and each cool ambient air inlet line has an ambient air intake opening which is located proximate the lower end of the respective water piston unit.

16. The solar energy system of claim 1 and further comprising a bi-directional water transfer pump disposed within the water transfer line.

17. The solar energy system of claim 1 and further comprising a service robot configured to travel beneath the solar panels.

18. The solar energy system of claim 17 and wherein the service robot is configured to spray water onto the solar panels.

19. The solar energy system of claim 17 and further comprising:

solar panel support frames to support the solar panel support trays, the solar panel support frames being rotatably supported by the support structure;

the service robot comprises a contactless positioner to rotate the solar panel support frames.

20. The solar energy system of claim 1 and wherein:

the support structure comprises four stanchions disposed in a rectangular plan view pattern defined by first and second parallel sides, and third and fourth parallel sides which are orthogonal to the first and second sides;

the support structure further comprises first and second trusses connecting together the stanchions which define the third and fourth parallel sides; and the system further comprises solar panel support frames to support the solar panel support trays, the solar panel support frames being rotationally supported between the first and second trusses.

\* \* \* \* \*